United States Patent [19]

Pfaff et al.

[11] Patent Number: 4,546,319

[45] Date of Patent: Oct. 8, 1985

[54] VACUUM TESTING METHOD AND APPARATUS

[76] Inventors: Ernest H. Pfaff, 1549 Woodvale Ave., Deerfield, Ill. 60015; Kenneth D. Mowbray, 726 S. Laurel, Des Planes, Ill. 60016; David R. Pacholok, 437 North Crystal, Elgin, Ill. 60120

[21] Appl. No.: 548,656

[22] Filed: Nov. 4, 1983

[51] Int. Cl.$^4$ .............................................. G01L 21/34
[52] U.S. Cl. ......................................... 324/460; 73/52
[58] Field of Search ....................... 324/460, 462, 464; 315/248; 73/52, 37

[56] References Cited

U.S. PATENT DOCUMENTS

| | | | |
|---|---|---|---|
| 2,734,628 | 2/1956 | Schlayer | 324/460 |
| 3,495,165 | 2/1970 | Cobine et al. | 324/460 |
| 4,021,727 | 3/1977 | Fellows | 315/248 |
| 4,053,814 | 10/1977 | Regan et al. | 315/248 |
| 4,359,668 | 11/1982 | Ury | 315/248 |
| 4,471,309 | 9/1984 | Lange et al. | 324/460 |

*Primary Examiner*—Stewart J. Levy
*Assistant Examiner*—Hezron E. Williams

*Attorney, Agent, or Firm*—Lee, Smith & Zickert

[57] ABSTRACT

A process and apparatus for testing the degree of vacuum in an evacuated vial. For testing the vacuum, a vial is located at a source of high voltage radio frequency power and the power is applied to the vial. A momentary intense flash of light is applied to the vial to cause ionization of the gas within the vial and the ionization current of the ionized gas within the vial is then sensed and a representation of the value of the ionization current is generated. The representation of the ionized current is compared with a minimum acceptable current value which is indicative of a predetermined minimum allowable vacuum within the vial. The vial is rejected if the measured ionization current is less than the minimum acceptable current value. In one embodiment, the apparatus includes a single station for testing evacuated vials, one at a time. In another embodiment of the apparatus, a plurality of vials are conveyed in a carousel through a series of testing stations. Acceptable vials continue to a downstream location, while unacceptable vials are rejected before release from the carousel.

20 Claims, 14 Drawing Figures

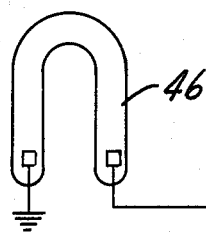
Fig. 10.
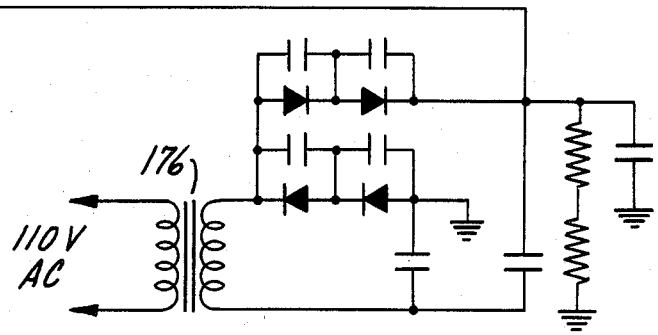
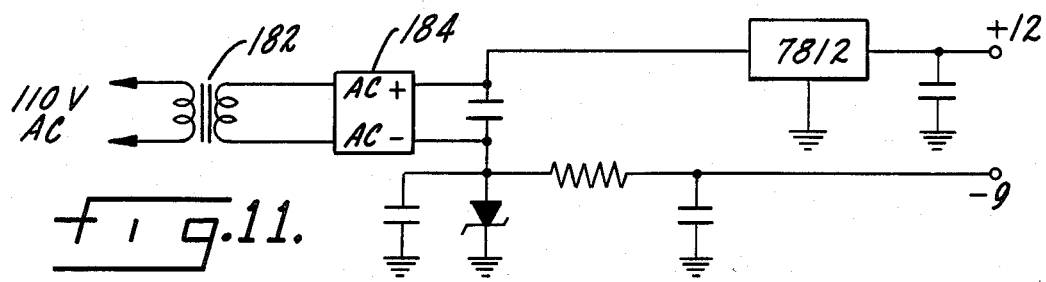
Fig. 11.
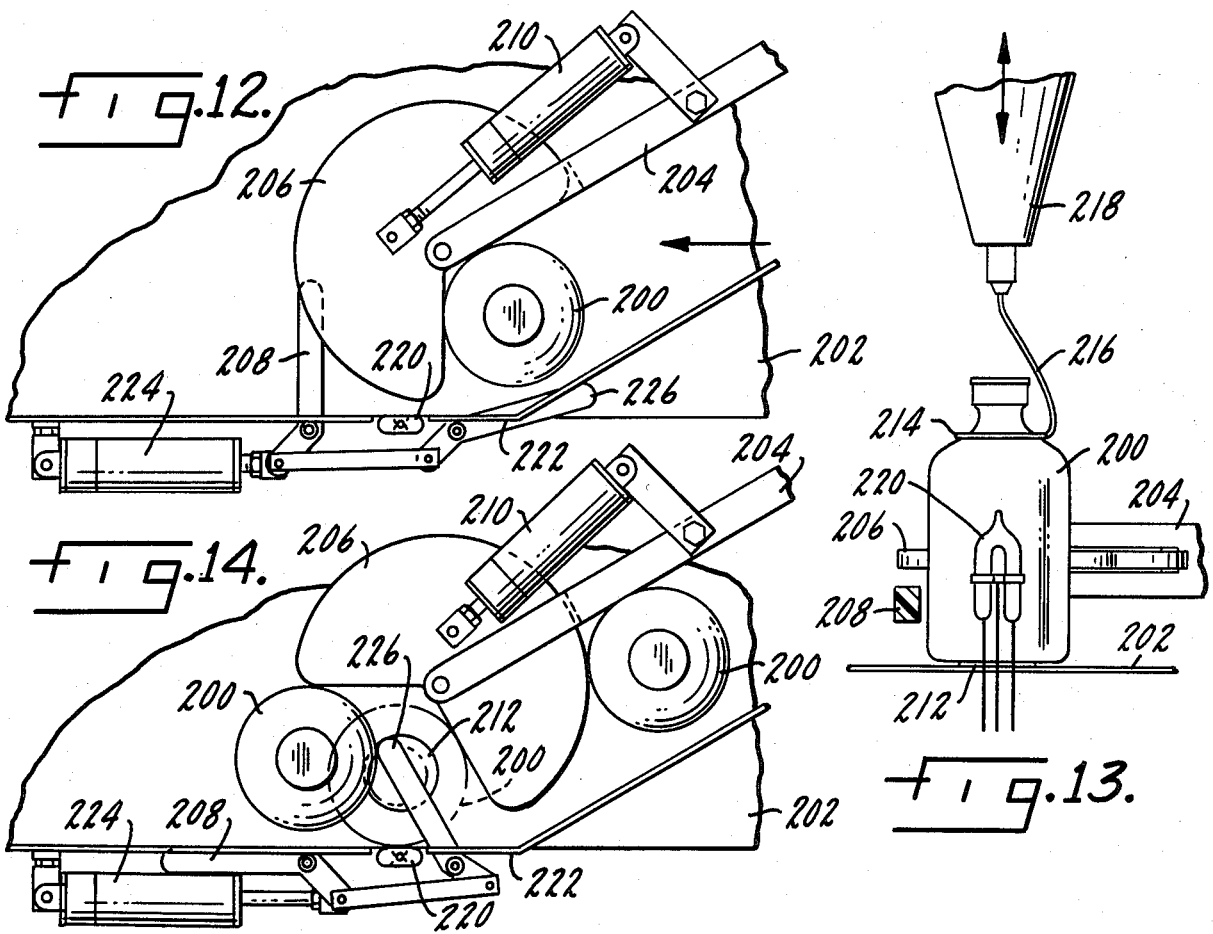
Fig. 12.
Fig. 13.
Fig. 14.

VACUUM TESTING METHOD AND APPARATUS

BACKGROUND OF THE INVENTION

This invention relates to the testing of the degree of vacuum in a evacuated vial, and in particular to a method and apparatus for testing the degree of vacuum by ionizing the gas within the vial and measuring the ionization current.

Evacuated vials can be tested without opening the vial or inserting any test probe or other device into the vial. For example, U.S. Pat. No. 1,917,465 to Schweitzer discloses a process and apparatus for testing a vial in which a high voltage is applied across an evacuated vial in order to cause the gas within the vial to glow. A similar process and apparatus is found in U.S. Pat. No. 2,519,807 to Yeater. Still other variations of this basic process and apparatus are found in U.S. Pat. No. 2,633,486 to Sweet, U.S. Pat. No. 3,839,655 to Heigland and U.S. Pat. No. 3,979,668 to Samulowitz. In the prior art set forth above, a high voltage is usually applied to the vial in order to cause the gas within the vial to ionize. When the gas ionizes, the color of the gas will then determine the degree of vacuum. Usually, a photocell is used to determine the amount of vacuum.

One of the problems of the prior art is that the high voltage applied to the vial must be sustained in order to cause ionization, and in certain instances, the high voltage can change the characteristics of the substance within the vial. This is unsatisfactory for many uses, particularly in the medical field, and therefore, for gases which do not ionize well, it is impossible to test the vacuum within a vial using prior art methods without altering the characteristics of the contents of the vial.

U.S. Pat. No. 2,524,929 to Razek and U.S. Pat. No. 2,734,628 to Schlayer disclose a method of testing the vacuum within an evacuated vial by shining a light through the vial and then detecting the light with a photocell. Like the prior art patents discussed above, however, both of these patents require a high voltage to be applied to the vial to cause ionization. The light which is shined through the vials is used simply for detecting the degree of vacuum by determining the ionization within the vial. Thus, these patents sufer the same deficiency of having the possibility that the contents of the vial can be altered by lengthy sustained application of high voltage to the vial in order to cause ionization.

SUMMARY OF THE INVENTION

The invention overcomes the deficiencies of the prior art by providing a method and apparatus in which sustained application of high voltage to a vial is unnecessary. Rather, high voltage is applied to a vial in a very short burst, while at the same time a flash of high intensity light is applied to the vial to cause ionization of the gas. The ionization current is then measured, and due to a direct relationship between the ionization current and the degree of vacuum within the vial, the amount of vacuum is readily determined.

In accordance with the process of the invention, a vial is located at a source of high voltage radio frequency power. The high voltage radio frequency power is applied to the vial while a momentary intense flash of light is applied to the vial to cause ionization of the gas within the vial. The ionization current of the ionized gas within the vial is sensed and a representation of the value of the sensed ionization current is generated. The representation is then compared with a given minimum acceptable current value indicative of a predetermined minimum allowable vacuum within the vial. If the ionization current within the vial is less than the minimum acceptable ionization current, the vial is rejected.

A number of vials can be tested in a continuous process in which different portions of the vials are sequentially tested. A particular quantity of the vials is first selected and then located in position for testing a first portion thereof. The high voltage radio frequency power and momentary intense flash of light are then applied to each of the vials of the first portion of the selected vials. The ionization current of the ionized gas within each of the first portion is sensed and a representation thereof is generated and compared with a given minimum acceptable current value indicative of a predetermined minimum allowable vacuum within a vial. The selected vials are then located in position for testing a second portion of the vials by the same steps of applying high voltage radio frequency power and a momentary intense flash of light to each of the vials. The ionization current thus generated within each vial is compared with the minimum acceptable current value and if the measured ionization current within any vial is less than the minimum acceptable current level, the vial is rejected. The remainder of the vials may then proceed for further processing.

When a plurality of vials are tested in a continuous process, the apparatus according to the invention includes means for conveying a particular quantity of the vials along a path from an inlet location for untested vials to an outlet location for tested vials. At least two testing stations are located along the path, each testing station being positioned for testing a different portion of the quantity of vials. At each testing station, high voltage radio frequency power and a momentary intense flash of light are applied to a different portion of the vials. The ionization current of each of the vials is detected and if the generated current falls below a minimum acceptable current value, the vial is rejected.

In accordance with the preferred embodiment of the invention, for conveying a plurality of vials, a carousel is provided having a rotary wheel with a plurality of notches in the circumference thereof. Each notch is shaped to accommodate and transport a vial and the wheel itself is rotated in predetermined incremental steps in order to transport the vials from one testing station to the next. At each testing station, a flash tube is used for applying the momentary intense flash of light to the vials to be tested.

The carousel includes a stationary support for the vial beneath the wheel and includes a series of outlets each having a normally closed gate. If a vial is to be rejected, at the appropriate time when the vial is positioned above an outlet, the gate is opened and the vial is permitted to drop through and thus be discarded.

A conveyor is used to convey incoming vials to the carousel and convey tested and unrejected vials from the carousel. The timing of the rotation of the carousel is such that the carousel is not indexed to advance the files from station to station until a sufficient number of vials is available at the inlet location for transportation by the carousel. In accordance with the illustrated embodiment of the invention, four vials are required to be present at the inlet to the carousel before the carousel can be indexed its next incremental step.

BRIEF DESCRIPTION OF THE DRAWINGS

The invention is described in greater detail in the following description of the examples embodying the best mode of the invention, taken in conjunction with the drawings, in which:

FIG. 10 is a schematic illustration of one embodiment of the circuitry for energizing a flash tube, FIG. 11 is a schematic representation of a typical low voltage power source for the circuitry of FIG. 9, FIG. 12 is a top plan illustration of the apparatus according to the invention for testing a single vial, showing the vial as it enters the apparatus for testing, FIG. 13 is a side elevational illustration of a vial in test position in the apparatus of FIGS. 12 and 14, and FIG. 14 is a top planned view similar to FIG. 12 showing a vial exiting the apparatus after having been tested (with the test position being shown in phantom) and showing a second vial in position for acceptance by the apparatus.

DESCRIPTION OF EXAMPLES EMBODYING BEST MODE OF THE INVENTION

Figure 1:
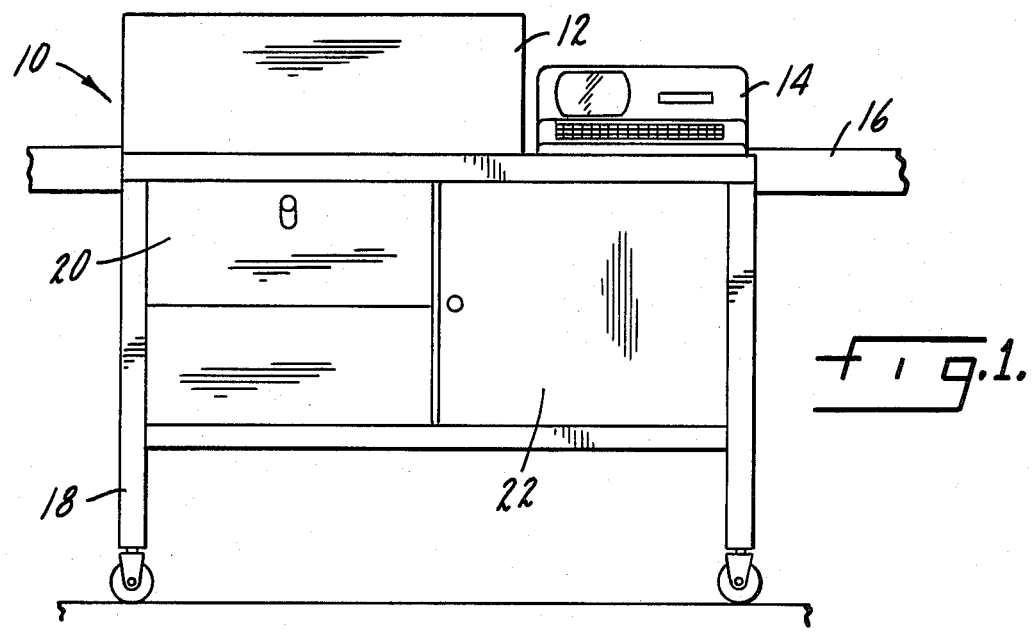
FIG. 1 is a front elevational illustration of the testing apparatus according to the invention, with a portion of an inlet/outlet conveyor appearing in the background.
Figure 2:
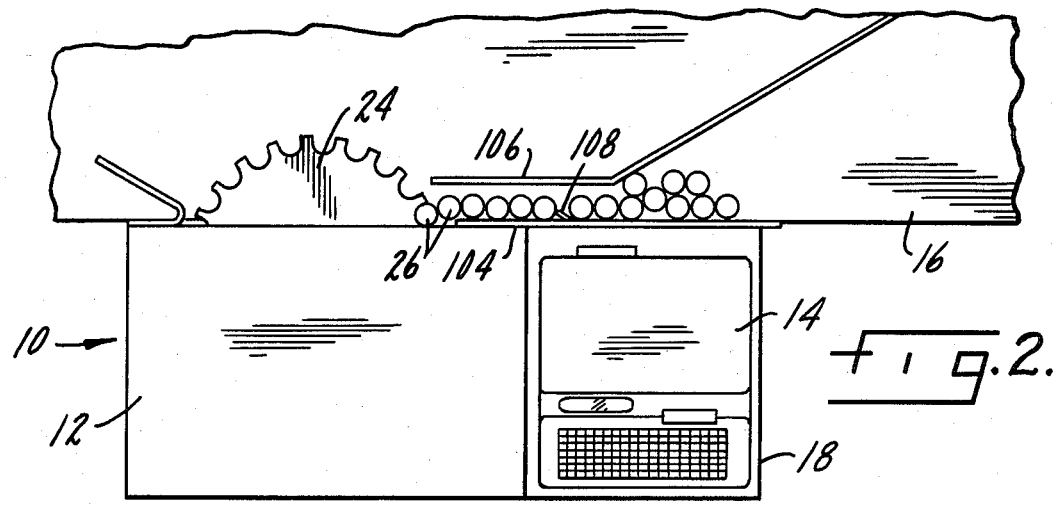
FIG. 2 is a top plan illustration of the apparatus according to the invention as shown in FIG. 1 with a portion of the inlet/outlet conveyor being illustrated.
Figure 3:
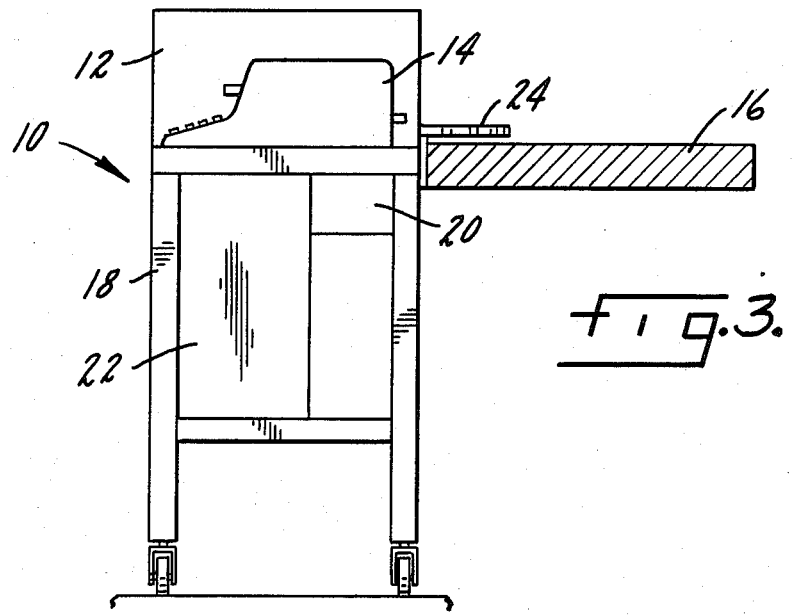
FIG. 3 is a right side elevational illustration of the apparatus of FIG. 1.
Figure 8:
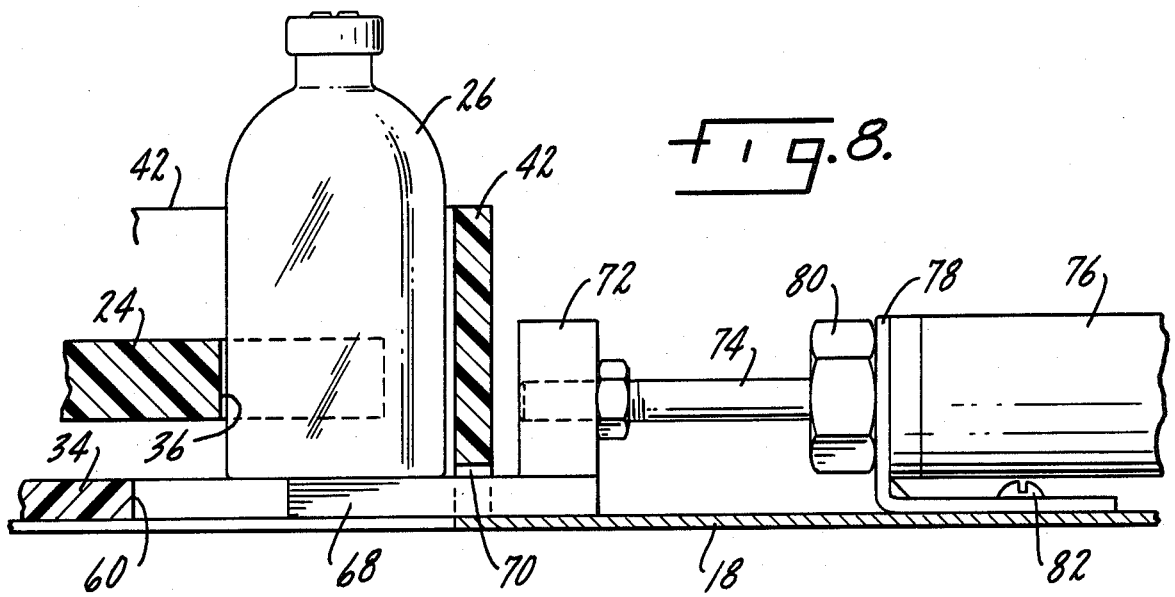
FIG. 8 is an enlarged cross-sectional illustration taken along lines 8—8 of FIG. 5 with the evacuated vial shown in full view.
Figure 9:
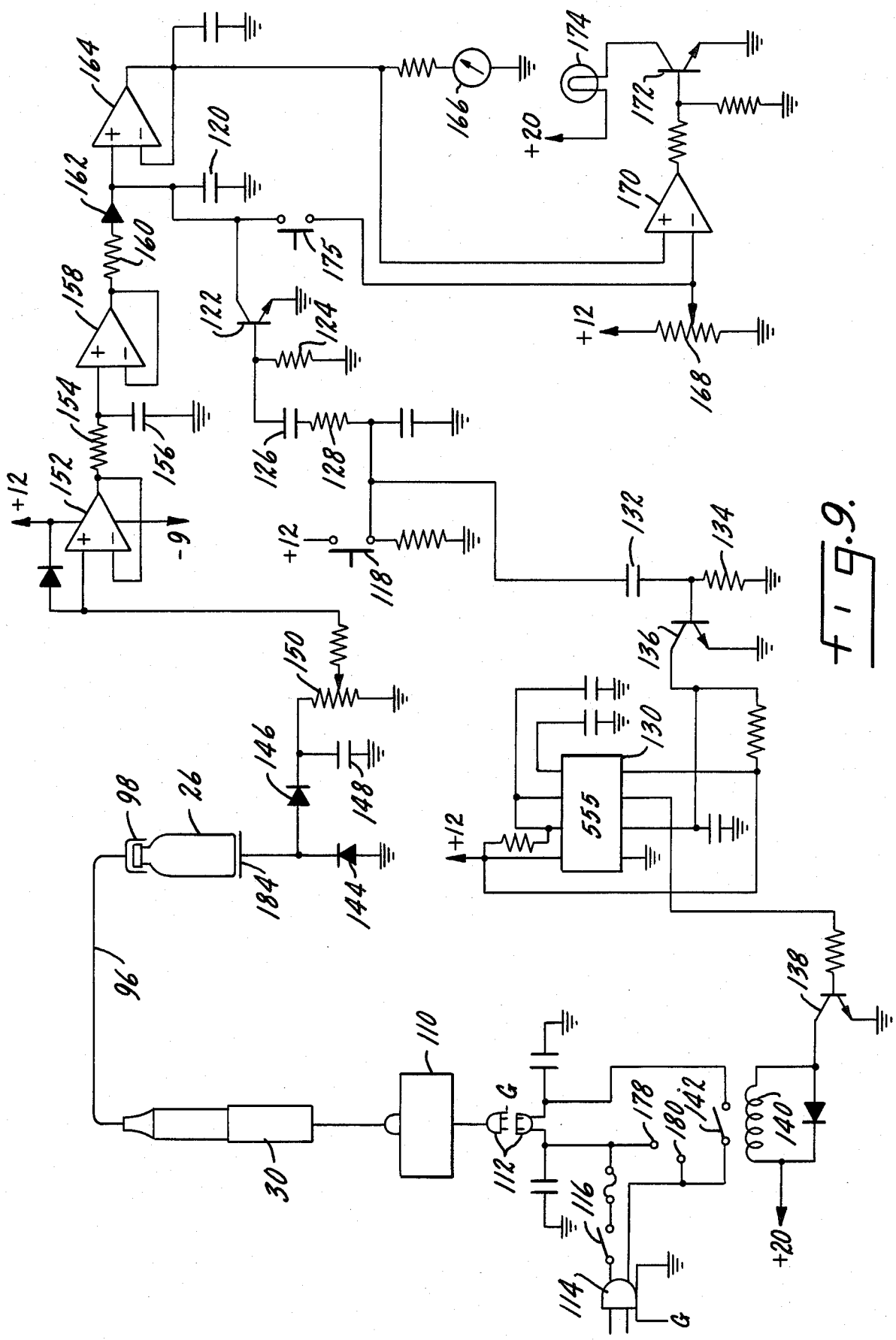
FIG. 9 is a schematic circuit diagram of one embodiment of the circuitry for testing an evacuated vial.

FIGS. 1 through 3 show an overview of the apparatus according to the invention which has generally been designated at 10. The majority of the portions of the apparatus for conveying and testing vials is located beneath a protective hood 12 and is described in greater detail in the ensuing description of FIGS. 4 through 8. A controller 14, preferrably either a programmable mini-computer or similar device for controlling the sequencing of apparatus is provided adjacent the protective hood 12. One embodiment of appropriate circuitry for the controller 14 is depicted in FIGS. 9-11.

With the exception of an input/output conveyor 16, the apparatus 10 is mounted on a cart 18 which provides ready mobility of the apparatus 10. If preferred, as is evident, the cart 18 may be made a permanent structure adjacent the conveyor 16.

The cart 18 includes a rejection receptacle 20 beneath the testing apparatus contained under the protective hood 12. The receptacle 20 is used to contain rejected vials until such time as they are removed and discarded. A cabinet 22 is also mounted on the cart 18 for containing various electrical and mechanical working components, as described in further detail below.

Figure 4:
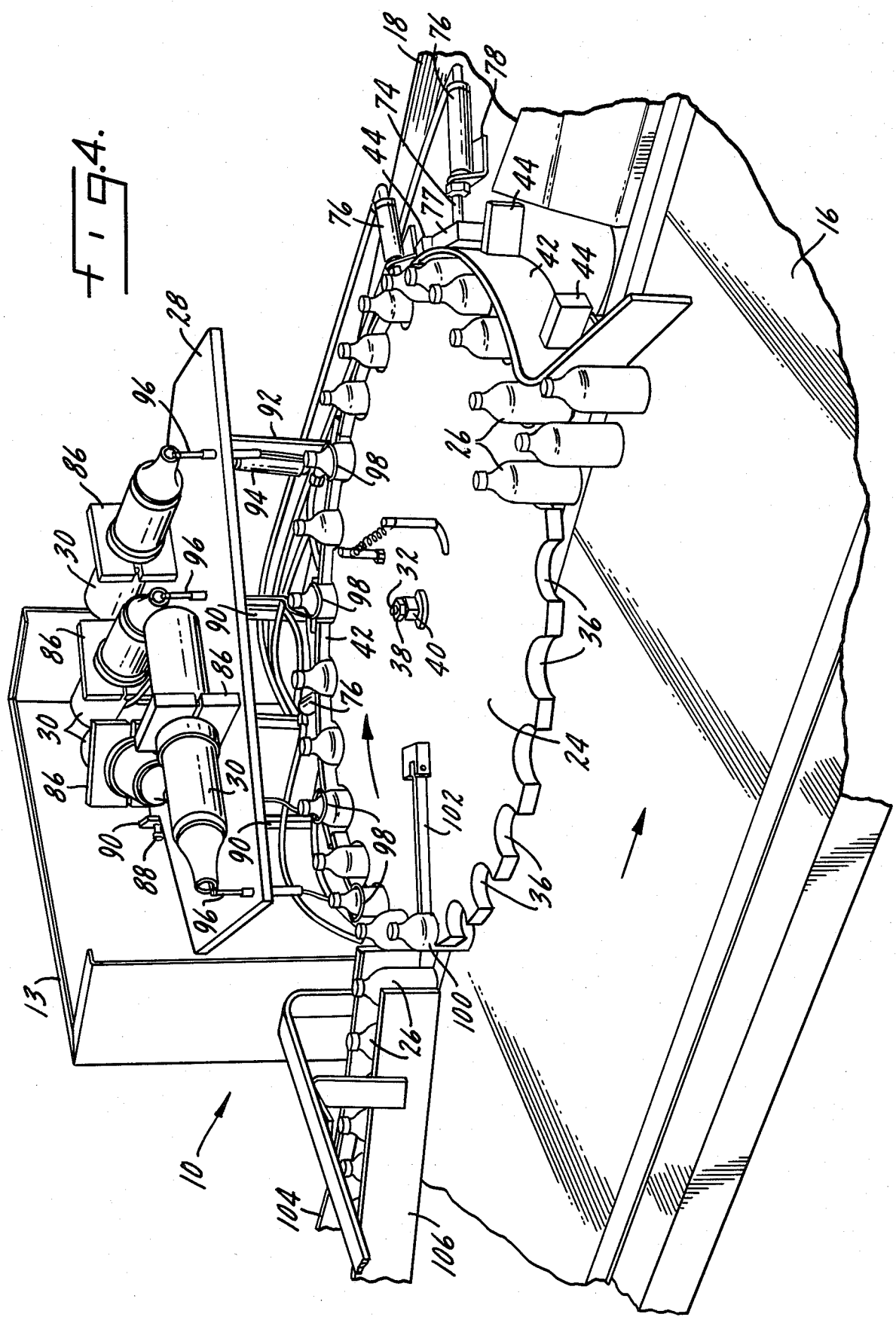
FIG. 4 is an enlarged perspective view of the apparatus according to the invention for testing a plurality of evacuated files in a continuous process.

FIG. 4 illustrates the apparatus 10 with the protective hood 12 removed. A shield 13, which may be a part of the hood 12 or separate therefrom, remains in this view of the apparatus 10. The shield 13 serves to protect the controller 14 from any spurious radiation from the remainder of the apparatus 10. Primary components of the apparatus 10 include a carousel wheel 24 which transports individual vials 26 as the vials are directed from the conveyor 16, and a platform 28 upon which a series of sources of high voltage radio frequency power 30 are mounted.

The carousel wheel 24 is mounted for rotation on a central shaft 32 and is positioned a slight distance above a stationary support 34 which is affixed to the top of the cart 18. The separation between the carousel wheel 24 and the support 34 is largely a matter of choice, and depends primarily on the height of the vials 26 which are to be tested. It has been found that a useful separation between the wheel 24 and support 34 is approximately that shown in FIGS. 6 and 8.

The shaft 32 extends through the stationary support 34 and is connected to a conventional drive motor (not illustrated) for the carousel wheel 24. The drive motor may conveniently be mounted within the cabinet 22 and be connected to the shaft 32 through appropriate gearing or a drive chain, or a combination of the two, as would be evident in accordance with the incremental rotation of the carousel wheel 24, described in greater detail below. Control of the motor may be by the controller 14, in a conventional manner.

Figure 5:
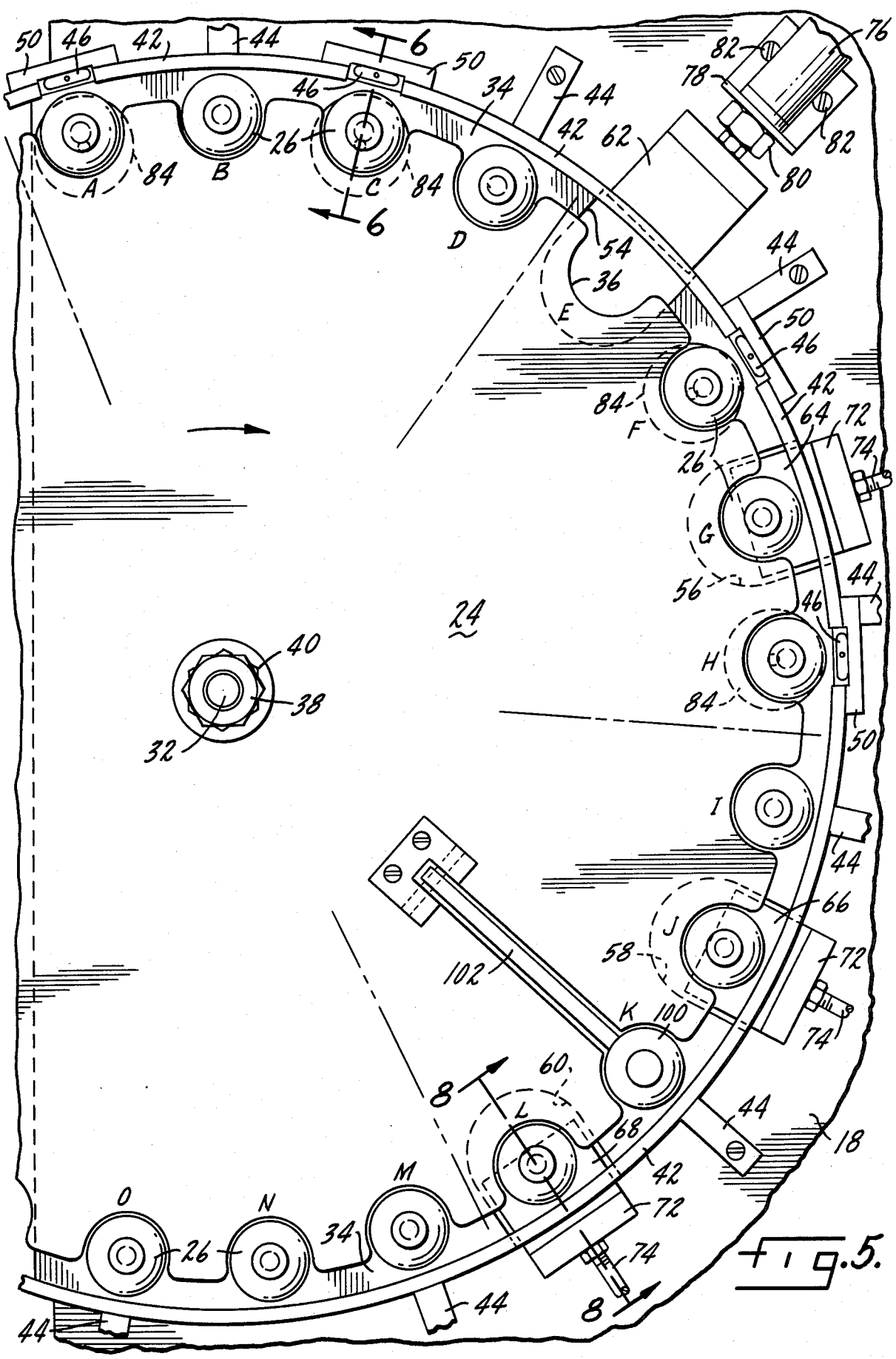
FIG. 5 is a further enlarged top plan illustration of the apparatus of FIG. 4 with portions omitted for clarity.

As shown in FIGS. 4 and 5, the circumference of the carousel wheel 24 is periodically interrupted by a plurality of notches 36, each of which is shaped to accommodate and transport an individual vial 26. As best shown in FIG. 5, the notches 36 are only slightly larger in width than the diameter of the vials 26 so that the vials 26 are properly oriented during the testing sequence and ensuing rotation of the carousel wheel 24.

More than one size of the vials 26 can be tested by the apparatus 10 of the invention. To accommodate larger vials, the carousel wheel 24 can be removed from the shaft 32. As shown in FIGS. 4 and 5, the carousel wheel 24 is attached to the shaft 32 by means of locking nuts 38 and 40. By simple removal of the nuts 38 and 40, the carousel wheel 24 can be removed and a different wheel 24 can be installed on the shaft 32.

As the carousel wheel 24 rotates, the vials 26 are held in place in their respective notches 36 by means of a guide 42. Braces 44 are situated periodically along the guide 42 to retain the guide 42 in place. The guide 42 is typically installed permanently in place, so that various vial sizes are accommodated varying by the appropriate depth and width of the notches 36 of the carousel wheel 24.

Figure 6:
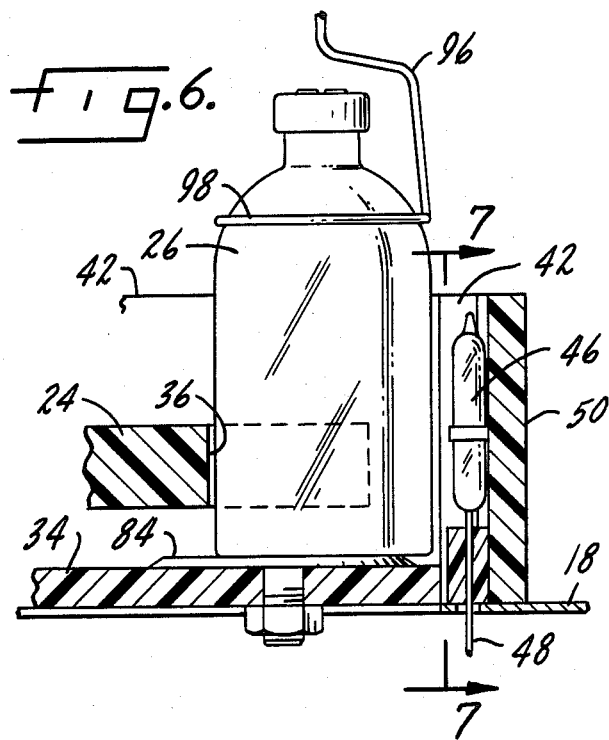
FIG. 6 is an enlarged cross-sectional illustration taken along lines 6—6 of FIG. 5.
Figure 7:
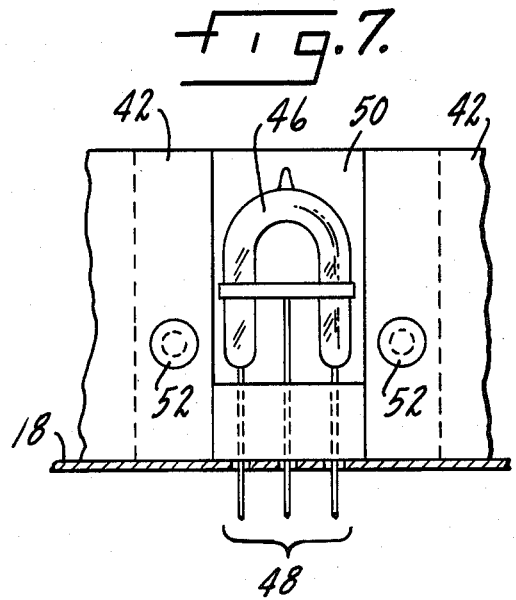
FIG. 7 is a view of one of the flash tubes for gas ionization taken along lines 7—7 of FIG. 6.

As best shown in FIGS. 5 through 7, a series of flash tubes 46 are set into the guide 42 at periodic locations. Wires 48 lead from the flash tubes 46 to a source of high voltage (FIG. 10) and the functioning of the tubes 46 is controlled by the controller 14 in a conventional manner. Each of the flash tubes 46 is backed by a block 50 which serves to orient the flash tubes and connect adjacent sections of the guide 42. The blocks 50 may be cemented to the guide 42, or may be affixed thereto by appropriate fasteners 52.

The stationary support 34 includes four outlets 54, 56, 58 and 60 positioned above the rejection receptable 20 such that rejected receptacles 26 may, when appropriate, be discharged from the carousel wheel 24 into the rejection receptacle 20. Each of the outlets 54 through 60 is normally closed by a respective gate 62, 64, 66 and 68. As best shown in FIG. 8 with respect to gate 68, the gates 62 through 67 are of generally the same thickness as the stationary support 34 so that vials 26 may pass thereover when the gates are closed without interference. Each of the gates 62 through 68 and its associated operating mechanism is identical. Therefore, the gate 68 (FIG. 8) will be described in detail, it being understood that the remaining gates 62 through 68 are identical in form and function.

The gate 68 extends through an aperture 70 in the guide 42. A block 72 is attached to the gate 68 and includes a threaded internal bore into which an extended ram 74 of an air cylinder 76 extends. The air cylinder 76 is operated by a source of pressurized air (not illustrated but preferrably within the cabinet 22), the application of which is controlled by the controller 14. The air cylinder 76 is attached to a bracket 78 by a nut 80, the bracket 78 being affixed to the top of the cart 18 by a screw 82. Therefore, extension or retraction of the ram 74 of the air cylinder 76 causes respective closing or opening of the gate 68 above the outlet 60.

Electrodes 84 are secured to the stationary support 34 at four locations adjacent the four flash tubes 46. Each of the electrodes 84 is connected to diagnostic circuitry (FIG. 9) used for the testing of the vacuum within a vial 26.

The voltage sources 30 are situated in supports 86 secured to the platform 28. The platform 28 is pivotally mounted above the carousel wheel 24 by a hinge 88 secured to upstanding braces 90 which are affixed to the top of the cart 18. A forward brace 92 maintains the horizontal orientation of the platform above the carousel wheel 24. Since the platform 28 must be pivoted upwardly before the carousel wheel 24 can be rotated (as described in greater detail below), an air cylinder 94 is positioned adjacent the forward brace 92. When the air cylinder 94 is activated by signals from the controller 14, the platform 28 is pivoted upwardly about the hinge 88.

Each of the voltage sources 30 includes an electrode 96 extending downwardly therefrom through an aperture in the platform 28. Each electrode 96 terminates in a loop 98 which is appropriately sized and positioned to engage the neck of a vial 26 when the platform is in the horizontal position shown in FIG. 4.

As shown in the drawings, the carousel wheel 24 has twenty-five notches 36. In the configuration of the apparatus 10 illustrated in FIGS. 1 through 8, it is intended that the carousel wheel 24 be advanced in incremental steps of four vial positions at a time. That is, when the carousel wheel 24 is rotated, each vial 26 will advance four positions before the carousel wheel 24 is stopped and the next testing sequence takes place. Ordinarily, therefore, the number of notches about the periphery of the wheel would most advantageously appear to be divisible by the number four. However, in order to assure that each of the testing locations is operational, a twenty-fifth notch is provided and is occupied a check or calibration vial 100. The vial 100 is permanently attached to an arm 102 affixed to the carousel wheel 24, and has a known internal vacuum. With the orientation of four testing locations as shown in the drawing figures, after four revolutions of the carousel wheel 24, the check vial 100 will have been located at each of the four test locations. Thus, calibration of the apparatus 10 is checked continuously as it operates.

Evacuated vials 26 are constantly introduced to the carousel wheel 24 by the conveyor 16 at an inlet location between guides 104 and 106. As best shown in FIG. 2, the guide 106 extends across the conveyor 16 and therefore channels the vials toward the guide 104 and eventually to the carousel wheel 24. A counter finger 108 extends through the guide 104 and, as each vial 26 passes, the counterfinger 108 is depressed, sending a signal to the controller 14 which can keep an active count of the number of vials 26 which have passed the counterfinger 108.

For the purposes of explanation of the operation of the apparatus 10, the positions of the notches 36 of the carousel wheel 24 as depicted in FIG. 5 have been lettered with reference letters A through O, respectively, to indicate the locations of the notches about the circumference of the wheel 24 when the wheel is at rest. While the wheel 24 does rotate, the positions A through O do not change, and for this discussion, always remain where shown in FIG. 5. The first four notches 36, positions A through D, constitute the positions of a first test station. The second four notches 36, positions E through H, designate the positions of a second test station. The third four notches 36, positions I through L, designate a third station at which no testing takes place. The fourth group of notches 36, positions M through O simply designate vial positions following the first three stations, as described.

When four vials have passed the counter finger 108, the controller 14 is programed to advance the carousel wheel a first incremental step of four vial positions. Therefore, the four vials 26 sequentially enter respective notches 36, and after the first incremental step of rotation of the carousel wheel 24 is completed, the four vials 26 are in positions A, B, C and D of the first test station. As can be seen from FIG. 5, flash tubes 46 and electrodes 84 are located only at positions A and C. Therefore, only vials 26 at these two locations can be tested.

When rotation of the carousel wheel 24 is completed to place the first four vials 26 in positions A through D, the controller 14 activates the air cylinder 94 to lower the platform 28, which had been raised to avoid interference with rotation, and thereby place loops 98 of electrodes 96 of the respective voltage sources 30 about the necks of the vials 26 located in positions A and C. The controller 14 then activates the flash tubes 46 at the positions A and C to cause ionization of the gas within the vials 26 at those positions, and also activates the associated voltage sources 30 to send a short burst of high voltage radio frequency power through each of the vials 26 at the positions A and C. The ionization current thus passing through the ionized vials 26 in positions A and C passes through electrodes 84 and is directed to the controller 14. As described in greater detail below in connection with FIG. 9, the sensed ionization current is compared with a given minimum acceptable current value indicative of a predetermined minimum allowable vacuum within a vial. That current value is stored by the controller 14 for use in rejecting a vial if the sensed ionization current is less than the minimum acceptable current value.

After completion of testing at locations A and C and assuming that four additional vials have been counted by the counter finger 108, the controller 14 activates the air cylinder 94 to lift the platform 28 to remove the loops 98 from the vials 26 in positions A and C. The controller then activates the motor for the carousel wheel 24 to cause the carousel wheel 24 to rotate another incremental step of four vial positions. Thus, vials 26 which were in positions A through D are rotated to positions E through H respectively. Four new vials 26 are located in positions A through D.

After the incremental rotation of the carousel wheel 24 is complete, the controller 14 activates the cylinder 94 to again lower the platform 28. Loops 98 are therefore placed about the necks of vials 26 in positions A, C, F and H. At the same time, testing is begun in both the first test station (positions A through D) and the second test station (positions E through H). Testing in the first station is identical to that described immediately above, and therefore is not repeated herein. Testing at positions F and H occurs in the same sequence as that of positions A and C. That is, the flash tubes 46 are activated, high voltage radio frequency power is passed through the vials 26 in these positions, through the electrodes 84, and then to the controller 14 for comparison of the detected ionization current with a minimum acceptable current value.

At the same time, since vials formerly in positions A through D are now located in positions E through H, respectively, the vials which were tested in positions A and C are in location to be rejected through the respective outlets 54 and 56, if necessary. As shown in FIG. 5, the gate 62 is retracted and therefore the vial which would normally be located in position E has dropped through the outlet 54 into the rejection receptacle 20. The gate 62 is activated by the controller 14 responsive to the test in the previous step of the vial 26 which was located at position A. Therefore, for this example, the results of that test indicated that the vial in position A did not have a minimum allowable vacuum, and the controller 14 withdrew the gate 62 when the bottle in position A was rotated to position E. Obviously, the same could have occurred at position G if the vial formerly in position C were found to have a vacuum below the predetermined minimum allowable vacuum.

After testing at the first test station (positions A through D), and testing and any needed rejection at the second test station (positions E through H), and assuming that four additional vials 26 have been counted by the counter finger 108, the controller 14 activates the cylinder 94 to raise the platform 28. The controller 14 then rotates the carousel wheel 24 another incremental step of four vial positions. Thus, the vials formerly in positions A through D are rotated to positions E through H and the vials formerly in positions E through H are rotated to positions I through L. Then, the controller 14 activates the cylinder 94 to lower the platform 28 and testing continues at the first test station (positions A through D) and the second test station (positions E through H), as described above. If either of the tested vials in positions F or H in the second test station were found to be below the minimum allowable vacuum, those vials are now in the third station (positions I through L) at respective positions J and L. The controller 14 activates the appropriate cylinder for gate 66 or 68 to withdraw the gate and therefore reject the defective vial or vials into the rejection receptacle 20.

It will be seen that the sequence of testing and rejection continues as described above. For those vials meeting the standards of minimum allowable vacuum, they continue along positions M through O and are stripped from the carousel wheel 24 by the conveyor 16, as best shown in FIG. 4. The conveyor 16 conveys those vials 26 to a downstream location (not illustrated), as appropriate.

FIG. 9 schematically illustrates the circuitry for testing a vial 26. It should be evident, after the following description, that the described circuitry can be duplicated and utilized in connection with each of the test locations (positions A, C, F and H of FIG. 5), or a similar function can be programmed into a general purpose mini-computer, such as controller 14 of FIGS. 1 through 3. It will be apparent to one skilled in the art, based upon the description of the form and function of the invention, that control circuitry can take on several forms. Only one form is shown in FIG. 9.

Elements which have previously been described bear the same reference numerals in FIG. 9: Perferrably, the voltage source 30 is one which delivers high voltage radio frequency power. By radio frequency, it is meant typical frequencies in the radio frequency range, 10 KHz through $10^6$ MHz. The applicant has found suitable for use the model BD-20 high voltage radio frequency source manufactured by Electro-Technic Products, Chicago, Ill. When the BD-20 is operated at 50 KV and 4 to 5 MHz, the voltage and frequency are sufficient for the purposes of the invention.

The voltage source 30 is connected to control circuitry 110 which develops the required high voltage radio frequency power. The control circuitry 110 in turn is connected through a plug-receptacle combination 112 to a main power source 114 through a main power switch 116.

When a vial 26 is in place on the electrode 84 and the loop 98 of the electrode 96 has been placed about the neck of the vial 26, testing is initiated by depression of a switch 118. Doing so discharges a sample and hold capacitor 120 by way of momentarily turning on a transistor 122 through a differential network consisting of a resistor 124 in parallel with a capacitor 126 and a resistor 128. Depressing the switch 118 also initiates the time cycle of a one shot timer 130 by way of a differentiation circuit consisting of a capacitor 132 and a resistor 134 connected to the base of a pulse amplification transistor 136. The timer 130 is a conventional model 555 timer manufactured by any one of many manufacturers, such as National Semiconductor Corporation, which is shown connected in a conventional manner. In the preferred embodiment of the invention, the timer 130 is controlled for a 150 millisecond timing cycle.

The output of the timer 130 is directed to a transistor 138 which begins to conduct during the timing cycle of the timer 130, thus closing the contacts 142 of a relay 140 for the duration of the timing cycle of the timer 130. This in turn activates the voltage source 30 for the timing cycle of the timer 130 and high voltage radio frequency power is applied through the electrode 96 and loop 98 to the vial 26. The flash tube 46 is in close proximity to the loop 98 (best shown in FIG. 6), and the leading edge of the voltage pulse from the loop 98 causes the flash tube 46 to flash. The combination of the brief burst of high intensity light from the flash tube 46 which preferably is on the order of 280 lumen seconds, and the high frequency high voltage from the voltage source 30 serve to ionize any gas in the vial 26 providing, as is well known, the gas pressure is within ionizationable limits, usually between 100 microns and 100 millimeters of mercury pressure. Above and below these pressures, ionization becomes unreliable.

Once the gas within the vial 26 is ionized, the vial 26 is capable of passing current created by the high voltage, high frequency power source 30. The impedance of the vial 26 is a function of its glass wall thickness, the geometry of the electrode loop 98 and electrode 84, and the pressure of the ionized gas within the vial 26. Since, for a given type of vial 26, the glass wall thickness and electrode geometry are virtually constant, the impedance will depend directly on the pressure of the ionized gas within the vial 26. Thus, by measuring the ionization current passing through the vial 26, the pressure of the gas within the vial can readily be determined.

A diode 144, diode 146, capacitor 148 and variable resistor 150 comprise a high frequency rectifier and filter of constant impedance. The ionization current flowing through the vial 26 places a charge on the capacitor 148 which is bled off by the variable resistor 150. Therefore, if a low pressure, low impedance vial 26 is located in the testing position, a high radio frequency current flows through the vial 26, resulting in a high filtered direct current voltage at the top of the variable resistor 150. For a high pressure, high impedance vial 26 in the test position, the opposite is true, and the voltage across the variable resistor 150 is inversely proportional to the impedance of the vial 26 under test.

A portion of the voltage across the variable resistor 150 is selected by its wiper and is fed through a high impedance buffer 152. Resistor 154 and capacitor 156 at the output of the buffer 152 serve to further filter any line voltage (60 hertz) ripple in the voltage of the buffer 152. An amplifier 158 amplifies the output of the buffer 152.

The combination of a following resistor 160, diode 162 and capacitor 120 served two functions. First, they filter the remaining ripple in the voltage output from the amplifier 158. Second, they serve as a sample and hold memory of the pressure within the vial 26, which is directly related to the voltage at the output of the amplifier 158. This is necessary because the test of the vial 26 lasts only for the 150 millisecond timing cycle of the timer 130, and therefore some means of storing data after the short test is required. Buffer amplifier 164 serves to isolate the capacitor 120 from any data output device that is used, such as an ammeter connected as a vacuum indicating meter 166.

A reference voltage indicative of a minimum acceptable vacuum is set on a potentiometer 168. If the voltage output from the buffer amplifier 164 is greater than the voltage set on the potentiometer 168, the output of the comparator 170 will be high, indicating that the vial 26 is acceptable. On the otherhand, if the voltage output from the buffer amplifier 164 is less than the voltage set on the potentiometer 168, this indicates that the vacuum of the vial 26 is unacceptable, the comparator 170 produces no output, and the vial 26 is then rejected.

A high output from the comparator 170 is applied to the base of a transistor 172 and turns on the transistor 172, which in turn lights a lamp 174. As is evident, the output of the comparator 170 can be otherwise used to indicate the absence or presence of acceptable pressure within the vial 26 rather than lighting a lamp such as the lamp 174.

In order to initially set the desired value of the potentiometer 168, a switch 175 is depressed. This causes the set voltage output of the potentiometer 168 to be read directly on the vacuum meter 166. The wiper of the potentiometer 168 can then be adjusted to whatever desired limit is to be set as read on the vacuum meter 166.

FIG. 10 illustrates a conventional high voltage circuit for applying voltage to the flash tube 46. Line voltage is applied to the input of a step-up transformer 176 and preferably the transformer 176 is attached to terminals 178 and 180 of the circuitry of FIG. 9. Since the circuitry for providing high voltage to the flash tube 26 is conventional, it is not described in greater detail.

FIG. 11 illustrates circuitry for providing the low voltage direct current values required in the circuitry of FIG. 9. A step-down transformer 182 is connected to a source of line voltage, preferably the terminals 178 and 180 of the circuitry of FIG. 9. The output of the transformer 182 is directed to a full wave rectifier 184 whose output is then sent to a conventional low voltage power supply as illustrated. Again, since the low voltage power supply of FIG. 11 is conventional, it is not described in greater detail.

FIGS. 12 through 14 illustrate a second embodiment of the invention for testing single vials one-at-a-time, and illustrate the successive sequential steps of handling and testing an evacuated vial. While testing circuitry for testing a vial is not shown, it should be evident that the circuitry of FIGS. 9 through 11 would function equally well with this embodiment of the invention.

In FIG. 12, a vial 200 to be tested is shown in a standby position on a moving conveyor 202. A fixed guiderail 204 had directed the vial 200 into a pocket formed in a rotatable indexing disc 206. In the indicated location, a downstream positioning finger 208 is across the future path of the vial 200. When the vial 200 is in the position shown in FIG. 12, a cylinder 210 is activated to rotate the disc 206 into the position shown in FIG. 14. The finger 208 remains in place, and therefore the vial is positioned directly above an electrode 212 which sits directly above, but not on, the conveyor 202. Rotation of the disc 206 urges the vial 200 onto the electrode 212, into the position shown in FIG. 13 and in phantom form in FIG. 14.

After the vial 200 is positioned on the electrode 212, a further air cylinder (not illustrated) is activated to lower the loop 214 of an electrode 216 about the neck vial 200. The electrode 216 extends from a source of high frequency, high voltage power 218 which can be identical to the voltage source 30 of the embodiment of FIGS. 1 through 8.

A flash tube 220 is positioned directly adjacent the vial 200 in a gap in an edge guard rail 222. With the vial 200 thus in place and the electrode loop 214 lowered about the neck of the vial 200, the testing is conducted in percisely the sequence described above, with the flash tube 220 initiating ionization of the gas within the vial 200. The electrode 212 serves the same function as the electrodes 84 in the first embodiment of the invention, and the testing sequence proceeds as described above.

As shown in FIG. 14, while the vial 200 being tested (shown in phantom) is in place on the electrode 212, an upstream vial 200 is blocked from entering the test area by the indexing disc 206. After the test has been completed, a further air cylinder 224 is activated as shown in FIG. 14. The cylinder 224 withdraws the positioning finger 208 from the path of the vial 200 and urges an ejecting finger 226 against the vial 200, pushing the vial 200 back onto the conveyor 202 for further downstream processing. If the vial 200 is found to be defective, it can be rejected downstream (means not illustrated), or otherwise handled.

After the ejected vial 220 has cleared the path of the indexing disc 206, the cylinder 210 is reactivated to return the indexing disc 206 to the initial position shown in FIG. 12. At the same time, the cylinder 224 is reactivated to place the positioning finger 208 in the blocking position shown in FIG. 12, and remove the ejecting finger 226 from the path of an incoming vial 200. The operating and testing sequence can then be repeated so long as additional vials 200 are presented on the conveyor 202 to the indexing disc 206.

The apparatus of FIGS. 12 through 14 can be modified if an automated testing line (that is, one using a conveyor and associated vial holding and handling equipment) is unnecessary. Thus, the vial 200 can be manipulated manually. All that is required is the high voltage power source 218 and its electrode 216, the electrode 212, the flash tube 220, and associated diagnostic electronics (such as that of FIG. 9). The vial is manually placed on the electrode 212, and is manually rejected if found to have an inadequate vacuum.

While two illustrative embodiments of the invention have been described, it will be evident that the invention can take other forms. For example, the embodiment of FIGS. 1 through 8 have been described in detail with two testing stations, each of which accommodates four vials 26, two of which are tested at each testing station. It should be evident that the number of testing stations can be increased or decreased, as desired, and the number of vials handled at each testing station can be increased or decreased as necessary. In addition, it should be evident that defective vials 26 can be ejected at any downstream location and not necessarily at the next indexed location of the carousel wheel 24. Various changes can be made to the invention without departing from the spirit thereof or scope of the following claims.

What is claimed is:

1. A process of testing the degree of vacuum in an evacuated vial, comprising the steps of
   a. locating the vial at a source of high voltage radio frequency power,
   b. externally applying high voltage radio frequency power to the vial,
   c. applying a momentary intense flash of light to the vial to cause ionization of gas within the vial, the duration of said flash of light being only long enough to begin ionization,
   d. sensing the ionization current of the ionized gas within the vial after said flash of light and generating a representation of the value of the sensed ionization current,
   e. comparing said representation with a given minimum acceptable current value indicative of a predetermined minimum allowable vacuum with the vial, and
   f. rejecting the vial if said representation is less than the minimum acceptable current value.

2. A process according to claim 1 in which steps "b" and "c" are performed simultaneously and step "b" is performed for a predetermined period of time.

3. A process according to claim 1 for testing the degree of vacuum in a plurality of evacuated vials, in which step "a" is performed for at least a portion of the vials, then steps "b" through "f" are then performed for said portion of the vials, then step "a" is repeated for a second portion of the untested vials and then steps "b" through "f" are repeated for said second portion.

4. A continuous process for testing the degree of vacuum in a plurality of evacuated vials including at least two sequential tests at each of which a different portion of the vials are tested, comprising the steps of
   a. selecting a particular quantity of vials for testing,
   b. locating the selected vials in position for testing a first portion of the selected vials,
   c. aplying high voltage radio frequency power to each of said first portion of the selected vials,
   d. applying a momentary intense flash of light to each of said first portion,
   e. sensing the ionization current of the ionized gas within each of said first portion and generating a representation thereof,
   f. comparing the representation of the sensed ionization current of each of said first portion with a given minimum acceptable current value indicative of a predetermined minimum allowable vacuum within a vial,
   g. locating the selected vials in position for testing a second portion of the selected vials,
   h. applying high voltage radio frequency power to each of said second portion of the selected vials,
   i. applying a momentary intense flash of light to each of said second portion,
   j. sensing the ionization current of the ionized gas within each of said second portion and generating a representation thereof,
   k. comparing the representation of the sensed ionization current of each of said second portion with a given minimum acceptable current value indicative of a predetermined minimum allowable vacuum within a vial, and
   l. rejecting a vial if the measured ionization current of the vial is less than the minimum acceptable current value.

5. A process according to claim 4 in which step "b" includes advancing the selected vials to a first station and step "g" includes advancing the selected vials from said first station to a second station.

6. A process according to claim 5 including advancing the selected vials from said second station to a third station, and in which step "l" is performed for said first portion at said second station and is performed for said second portion at said third station.

7. A process according to claim 5 including the steps of selecting a second particular quantity of vials for testing, and advancing said second quantity to said first station when said first quantity of vials is advanced from said first station to said second station.

8. An apparatus for testing the degree of vacuum in an evacuated vial, comprising
   a. a test station for said vial,
   b. means at said test station for externally applying high voltage radio frequency power to said vial,
   c. means at said test station for applying a momentary intense flash of light to the vial of sufficient magnitude to cause ionization of gas within the vial, said means for applying including means for generating said flash of light only long enough to begin ionization,
   d. detecting means at said test station for sensing the ionization current of ionized gas within the vial,
   e. means for providing a current value representative of a given minimum acceptable ionization current of the ionized gas,
   f. means connected to said detecting means for comparing the sensed ionization current with said current value, and g. means of reject the vial if said sensed ionization current is less than said current value.

9. An apparatus according to claim 8 in which said means for applying a flash of light comprises a flash tube at said test station.

10. An apparatus according to claim 9 including a high voltage cicuit for activating said flash tube, and including means for energizing said high voltage circuit simultaneously with application of high voltage radio frequency power to said vial.

11. An apparatus for testing the degree of vacuum in a plurality of evacuated vials, comprising
   a. means for conveying a particular quantity of vials along a path from an inlet location for untested vials to an outlet location for tested vials,
   b. first and second testing stations along said path, each testing station being located for testing a different portion of said particular quantity of vials,
   c. means at said first testing station for applying high voltage radio frequency power to each vial of a first portion of said particular quantity of vials,
   d. means at said first testing station for applying a momentary intense flash of light to each vial of said first portion of sufficient magnitude to cause ionization of gas within the vial,
   e. means at said second testing station for applying high voltage radio frequency power to each vial of a second portion of said particular quantity of vials,
   f. means at said second testing station for applying a momentary intense flash of light to each vial of said second portion of sufficient magnitude to cause ionization of gas within the vial,
   g. means for individually sensing the ionization current of the ionized gas within each vial of said first and second portions and generating a representation thereof,
   h. means for comparing the generated representation of the ionization current of the ionized gas within each vial of said first and second portions with a given minimum acceptable current value indicative of a predetermined minimum allowable vacuum within a vial, and
   i. means for rejecting a vial if the generated representation is less than the minimum acceptable current value.

12. An apparatus according to claim 11 in which said means for conveying comprises a carousel having a rotary wheel with a plurality of notches in the circumference thereof, each notch being shaped to accommodate and transport a vial, and including means for rotating said wheel in predetermined incremental steps.

13. An apparatus according to claim 12 in which said carousel includes a stationary support for said vials beneath said wheel, and in which said means for rejecting comprises at least one outlet in said support and a normally closed gate for said outlet, and including means for opening said gate responsive to said comparing means.

14. An apparatus according to claim 11 in which said means at said first and second test stations for applying a momentry intense flash of light comprises a flash tube.

15. An apparatus according to claim 11 including a conveyor in registration with said inlet and outlet locations for conveying vials to be tested to said inlet location and tested vials from said outlet location.

16. An apparatus according to claim 11 including means for selecting said particular group.

17. An apparatus according to claim 16 in which said means for selecting comprises a guide to direct vials to said means for conveying and a counter for determining the quantity of vials directed to said means for conveying.

18. An apparatus according to claim 11 including a reference vial having a known vacuum, and in which said conveying means includes means for transporting said reference vial through said testing stations for periodically calibrating said means for individually testing.

19. An apparatus for testing the degree of vacuum in a plurality of evacuated vials, comprising
   a. a carousel having a stationary support for said vials and a rotary wheel with a plurality of notches in the circumference thereof, each notch being shaped to accommodate and transport a vial,
   b. means for selecting a particular quantity of vials for conveying by said carousel from an inlet location for untested vials to an outlet location for tested vials,
   c. means for rotating said wheel in incremental steps past a plurality of stations,
   d. means for retaining said vials in said notches as said wheel is rotated past said plurality of stations,
   e. said stations including first and second testing stations positioned positioned along the circumference of said wheel,
   f. means at said first testing station for applying high voltage radio frequency power to a first portion of said particular quantity of vials,
   g. means at said first testing station for applying a momentary intense flash of light to each vial of said first portion of sufficient magnitude to cause ionization of gas within the vial,
   h. means at said second testing station for applying high voltage radio frequency power to a second portion of said particular quantity of vials,
   i. means at said second testing station for applying a momentary intense flash of light to each vial of said second portion of sufficient magnitude to cause ionization of gas within the vial,
   j. means for sensing the ionization current of the ionized gas within each vial of said first and second portions and generating a representation thereof,
   k. means for comparing the generated representation of the ionization current of the ionized gas within a vial with a given minimum acceptable current value indicative of a predetermined minimum allowable vacuum within a vial,
   l. at least one outlet in said support and a normally closed gate for said outlet,
   m. means to open said gate responsive to said comparing means and reject a vial if the generated representation is less than the minimum acceptable current value.

20. An apparatus according to claim 19 in which a said outlet is located between said first and second stations and a further outlet is located between said second station and said outlet location for tested vials.

* * * * *